United States Patent [19]

Sakai et al.

[11] Patent Number: 4,496,598
[45] Date of Patent: Jan. 29, 1985

[54] PROCESS FOR PREPARING MUSTARD FLOUR

[75] Inventors: Shiro Sakai, No. 4-15-9, Nakamachi, Urawa-shi, Saitama-ken, Japan; Etsuo Ebisawa, Soka, Japan

[73] Assignees: Shiro Sakai; Sumiko Sakai, both of Saitama, Japan

[21] Appl. No.: 433,218

[22] Filed: Oct. 7, 1982

[30] Foreign Application Priority Data

Oct. 8, 1981 [JP] Japan ................................ 56-159432

[51] Int. Cl.³ .......................... A23L 1/225; C11B 1/06
[52] U.S. Cl. .................................. 426/417; 260/412.2; 426/489; 426/638
[58] Field of Search ............... 426/622, 638, 629, 650, 426/518, 489, 520, 486, 447, 507, 468, 417, 481; 260/412.2

[56] References Cited

U.S. PATENT DOCUMENTS

| | | | |
|---|---|---|---|
| 2,246,528 | 6/1941 | Musher | 426/447 |
| 2,615,905 | 10/1952 | Georg et al. | 426/629 |
| 3,574,640 | 4/1971 | Dougherty | 426/507 |

*Primary Examiner*—George Yeung

[57] ABSTRACT

A process for producing an improved mustard seed flour is disclosed wherein mustard seeds are de-oiled, subjected to heating under conditions to deactivate myrosinase enzyme in the seeds to reduce pungency, followed by grinding to form a flour of reduced pungency, good flavor, enhanced protein content and enhanced preservability.

7 Claims, No Drawings

PROCESS FOR PREPARING MUSTARD FLOUR

BACKGROUND OF THE INVENTION

The present invention relates to the preparation of mustard flour which has a high protein content and which is characterized by removing the pungency and fatty material from mustard seeds.

Generally, spices are used for their masking effects which mask the smell of food and enhance its taste in addition to providing pungent effects. In the case of ordinary mustard, for example, as used for grilling, cooked vegetables, cooked fish, meats etc., it is mainly used for its pungency; however, white mustard used for salad, sauces etc. is selected more for its taste than pungency.

The pungency of mustard is a result of an active enzyme, myrosinase, which is generated by adding water to the mustard. The myrosinase hydrolyzes to form glycoside sinigrin and allyl isothiocyanates. Heretofore, when the mustard was employed as a masking material, the following procedure was used to remove its pungency. Namely, after grinding mustard seed to form flour, a quantity of water is added to the ground seeds so as to promote the hydrolysis reaction of myrosinase to generate pungency and then, to remove the pungency thereafter, the ground mustard seed is subjected to drying for preparing the product.

However, when following the conventional procedure described above, mustard flavor is liable to be destroyed because water is added to the mustard seed after grinding it. Moreover, the aforesaid conventional prior art procedure takes too long to be economical when first treating the ground mustard seed with water and then removing its pungency. Furthermore, it is troublesome to add water to the mustard flour, and then dry it again.

SUMMARY OF THE INVENTION

It is an object of present invention to provide a process for producing mustard flour to minimize the pungency from the mustard by heating the mustard seed in order to decrease the activity of the myrosinase, contrary to the prior art wherein water is added to the mustard seed to enhance the activity of myrosinase and to generate pungency.

It is another object of the present invention to provide a mustard flour of low pungency by heat-treating the mustard, preferably at a temperature of about 60°-200° C., at a pressure of about 0.2-4.0 kg/cm$^2$ and for a time of about 1-60 minutes.

DETAILED DESCRIPTION OF THE INVENTION

According to the present invention, the pungency of the mustard is suppressed by inactivating myrosinase as a result of the heat treatment of the mustard. Although the conditions of heat treatment depend on the condition of the mustard seed, it is generally heated at a temperature of about 60°-200° C., a pressure of 0.2-4.0 kg/cm$^2$ and for a heating time of about 1-60 minutes. The temperature and pressure ranges may vary somewhat according to the heating time. For example, if the heating temperature is controlled according to pressure and heating time, it is difficult to inactivate the enzyme at a temperature below 60° C. when subjecting the mustard to 1 atmosphere pressure and 1 hour of heating; and also, above 200° C. under the same conditions, the mustard is toasted to burnt amber and objectionable smells result. Also, it is difficult to inactivate the enzyme at a pressure below 0.2 kg/cm$^2$ at a temperature of 100° C. and heating for 1 hour, and conversely, use of a pressure beyond 4.0 kg/cm$^2$ under the same conditions decreases the commodity value of the mustard by resulting in a burnt smell as described above.

Accordingly, it should be clear that while the heating and pressurizing time may vary with temperature and pressure conditions, the preferable conditions of treatment are about 3 minutes at about 130° C. and 4 kg/cm$^2$ or about 10 minutes at about 100° C. and 2 kg/cm$^2$.

Moreover, heating above 60 minutes at 1 atmospheric pressure and at a temperature of 100° C. makes the mustard burnt. On the other hand, heating less than one minute under the same conditions is insufficient to inactivate the enzyme.

As described above, the mustard flour of the present invention inactivates myrosinase to suppress the decomposition of sinigrin, thereby controlling the pungency of the resulting product. Concurrently, the inactivation of myrosinase increases the preservability of mustard so treated.

Generally, the causes of the deterioration of a mustard product can be traced to the following factors:

(A) Generated pungency components and existing decomposed by-products;

(B) Predecomposed pungency components containing active enzyme; and (C) Bacterial contamination.

Thus, the remaining active proteolytic enzyme myrosinase and pungency component, sinigrin, in a mustard product, the decomposition by-products of the pungency component is promoted in the product by the action of myrosinase and on the other hand, the decomposition of crude protein in the product is further promoted by the action of said myrosinase. This process is believed to be the casue of decreased preservability of the product. It has now been found that suppressing the decomposition of the pungency component by the action of myrosinase can accomplish the elimination of pungency from mustard without changing the appearance, flavor and other contained components and also improving its preservability.

Heretofore, in the process for preparing mustard, de-oiling the same has been conducted for lasting pungency; however, it is not necessary to conduct it to preserve the pungency in the mustard flour; and indeed, the pungency may advantageously be removed, as described above.

In prior art methods the pungency component is generated by adding water to mustard flour, the water is added rather positively without de-oiling the mustard and thereafter the pungency is reduced by drying.

On the other hand, in the present invention, it is not necessary to extinguish pungency only by de-oiling the mustard, but by the same token, it is also possible to exclude fat positively if desired because the myrosinase is so inactivated as to minimize the pungency by the heat treatment previously described.

Therefore, the present invention is based on different concepts from the previous de-oiling processes for preserving pungency; namely, it adopts the removal of oil from mustard seed only for increasing the relative protein content of the mustard before heat treatment. For example, considering yellow mustard seed, generally it contains 31.2% of protein 28% of crude fat and 9% of moisture, in round numbers. If, 15–20% of fat from the seed is removed by conventional de-oiling, then drying it to below 5% moisture results in an enhanced protein content of 41–44% in round numbers. The de-oiling procedure is accomplished by cracking mustard seed, and thereafter compressing it or chemically extracting oil from it.

It is preferable to conduct the compressing as follows: The seed is coarsely cracked in order to break the hulls etc. of the seed so as to permit fat to flow out easily. Then the seeds are compressed in order to remove the fat. In this case, it is preferable to conduct said treatment at conditions of temperature below about 65° C., pressing time of about 5 minutes and at a pressure above about 1,000 kg/cm$^2$. It is not effective to conduct the pressing time over 5 minutes because the fat does not flow out, thereafter, so much and a pressure less than 1,000 kg/cm$^2$ requires too much time for pressing the seed or results in too little oil removal.

The present invention is particularly characterized in its broadest aspects by conducting said heat treatment after removing oil from mustard seed as described above, but it is intended to also embrace cooling and drying the so-treated mustard seed and grinding it to form flour after heat treatment.

As previously described such mustard flour enhances the masking effect of the spice without destroying mustard flavor, and in addition enhances protein content and preservability of the mustard, making it more desirable for various cooking and finished foods than ordinary mustard.

The present invention is further described by way of the following examples which are merely illustrative of, and are not intended to limit the invention:

EXAMPLE 1

Yellow mustard seed 100 kg is used for material. Then, the mustard seed is coarsely cracked and is placed in a press. In the press, the mustard seed is compressed for 5 minutes at a pressure of 1,00 kg/cm$^2$ and temperature of 65° C. in order to remove 4.5–5.6 kg of oil. Then 95.8–94.4 kg of de-oiled cake is placed in a closed type heating device and heat treated under conditions of temperature, time and pressure as shown in Table 1. Thereafter, the change of appearance and the active strength of enzyme was investigated and recorded. The results also appear in Table 1.

TABLE 1

| Experiment | Temp. (°C.) | Pres. (kg/cm$^2$) | Time (min.) | Change of appearance | Activity of enzyme (%) |
|---|---|---|---|---|---|
| No. 1 | 140 | 2.0 | 2 | + | 0.0 |
| No. 2 | 130 | 2.0 | 4 | + | 0.0 |
| No. 3 | 120 | 2.0 | 6 | − | 3.0 |
| No. 4 | 110 | 2.0 | 8 | − | 3.07 |
| No. 5 | 100 | 1.0 | 10 | − | 4.0 |
| No. 6 | 90 | 0.8 | 12 | − | 7.3 |
| No. 7 | 80 | 0.6 | 14 | − | 21.0 |
| No. 8 | 70 | 0.4 | 16 | + | 60.0 |
| No. 9 | 60 | 0.2 | 18 | + | 68.0 |
| No. 10 | 50 | 0 | 60 | +++ | 83.0 |
| No. 11 | 40 | 0 | 90 | +++ | 100 |
| Control | 0 | 0 | 0 | − | 100 |

Note 1
Marks of "Change of appearance" column in Table 1 have following meaning:
− ... Not changed appearance
+ ... A little changed appearance
+++ ... Seriously changed appearance and no commodity value.

Note 2
Percentages of activities of enzymes shown in Table 1 are ones of enzymes picked up from every experiment including the control. Higher percentage indicates the higher activity of enzyme.

As is clear from the results, the activites of enzymes were not decreased in experiments No.10 and No.11 and indicated almost the same values as the control. On observing each change of the appearance of these experiments, both samples of experiments 9 and 10 became drastically discolored so as to lower commodity value.

Thus, the deviation from the range of heat treatment conditions according to the present invention fails to result in a desired mustard product.

EXAMPLE 2

The results of comparative experiments with two materials, namely mustard flour (A) of present invention and (B) conventional mustard flour are shown in Table 2. As clearly shown in Table 2, the protein content of the mustard flour (A) of present invention is about twice that of the conventional mustard flour (B).

TABLE 2

|  | (A) | (B) |
|---|---|---|
| Moisture content | 4.5(%) | 6.24(%) |
| Crude Fat | 8.0 | 29.1 |
| Crude protein | 42.7 | 28.8 |
| Ash | 4.8 | 3.4 |
| Fiber | 11.1 | 10.3 |
| Glycide | 28.9 | 22.16 |

EXAMPLE 3

Samples of various compositions of mustard formulations shown in Table 3 were prepared and tested for preservability at 25° C. In this table the samples employed are as follows:
Sample 1—No mustard
Sample 2—Untreated mustard flour
Sample 3—mustard flour of reduced pungency prepared by conventional hydration
Sample 4—mustard flour prepared according to the present invention. (Example 1 and ground to flour)

The mustard flour of sample 3 was prepared by the following procedure:

Ground mustard seed (20 mesh) and warmed water (70° C.) were provided; then 25% of the ground mustard seed is mixed into 75% of the warmed water by stirring (turning 120/minute). Thereafter, stirring was continued for 30 minutes so as to swell the mixture thoroughly, the mixture presented a slurry generating pungency components by hydrolysis. The slurry was sprayed into the atmosphere at a wind velocity of 20 m/sec and temperature of 100° C. to dry as well as to remove residual pungency components, and thereby reduce the moisture content of the final product to 6.0%.

TABLE 3

| Composition | Samples and proportions (wt. %) | | | |
| --- | --- | --- | --- | --- |
|  | (1) | (2) | (3) | (4) |
| Lean Pork | 35.0 | 35.0 | 35.0 | 35.0 |
| Pork Fat | 25.0 | 25.0 | 25.0 | 25.0 |
| Mustard flour | — | 2.5 | 2.5 | 2.5 |
| Casein-Na | 3.8 | 2.8 | 2.8 | 2.8 |
| Starch | 6.5 | 5.0 | 5.0 | 5.0 |
| Condiment | 2.5 | 2.5 | 2.5 | 2.5 |
| Salt | 2.0 | 2.0 | 2.0 | 2.0 |
| Polymerized phosphoric acid | 0.5 | 0.5 | 0.5 | 0.5 |
| Sodium nitrate | 0.1 | 0.1 | 0.1 | 0.1 |
| Ice Water | 24.6 | 24.6 | 24.6 | 24.6 |

The results of these tests are shown in Table 4.

TABLE 4

| Sample | Test Items | Lapsed days at 25° C. | | | | |
| --- | --- | --- | --- | --- | --- | --- |
|  |  | 0 | 2 | 4 | 6 | 8 |
| (1) | Change of color | — | — | + | + | ++ |
|  | Pungency | None | None | None | None | None |
|  | Odor | Presenting meat fishy and rotted stench after 4 days | | | Both smells are strong | |
|  | Elasticity | — | + | ++ | ++ | ++ |
| (2) | Change of color | — | + | + | ++ | ++ |
|  | Pungency | Yes | Yes | Yes | Yes | Yes |
|  | Odor | None | Stench of decomposed pungency component | | Strong stench | |
|  | Elasticity | — | ++ | +++ | +++ | +++ |
| (3) | Change of color | — | + | + | + | ++ |
|  | Pungency | None | None | None | None | None |
|  | Odor | None | None | Smell of Yeast | | |
|  | Elasticity | — | + | + | ++ | ++ |
| (4) | Change of color | — | — | + | + | ++ |
|  | Pungency | None | None | None | None | None |
|  | Odor | None | None | None | None | None |
|  | Elasticity | — | — | — | — | + |

Note:
Marks shown in Table 4 indicate following meanings:
- ... Not changed, good
+ ... Changed a little
++ ... Changed
+++ ... Conspicuously changed and loss of commodity value.

As can be seen from the results in Table 4, sample 4 containing the mustard flour prepared according to the present invention demonstrated excellent preservability compared with the others tested.

Since a comparison of samples 3 and 4 showed that there is a difference in odor and elasticity, particularly a conspicuous difference in elasticity, the following examples 4 and 5 were designed individually for the examination of various water adding rates and emulsifying degrees.

EXAMPLE 4

Two samples were prepared with the combination of ingredients shown in table 5. The samples of section (A) were of conventional mustard flour of reduced pungency prepared by conventional hydration and of section (B) mustard flour prepared according to the present invention.

TABLE 5

| Test Section | Composition | Water adding rate | | |
| --- | --- | --- | --- | --- |
|  |  | 5 times | 7 times | 10 times |
| (A) | Mustard flour | 20 g | 20 g | 20 g |
|  | Water | 100 ml | 140 ml | 200 ml |
| (B) | Mustard flour | 20 g | 20 g | 20 g |

TABLE 5-continued

| Test Section | Composition | Water adding rate | | |
| --- | --- | --- | --- | --- |
|  |  | 5 times | 7 times | 10 times |
|  | Water | 100 ml | 140 ml | 200 ml |

The samples so prepared were tested as follows: Every sample of section (A) and (B) was carefully selected, then controlled at a temperature of 30° C. Thereafter, the samples were prepared in a homogenizer by stirring 5,000 r.p.m. for 60 seconds; then they were individually put into vessels to determine the viscosity with a brabender viscograph-amylograph.

The results of the above tests are shown in Table 6.

TABLE 6

| Test Section | Viscosity (cp) Water adding rate | | |
| --- | --- | --- | --- |
|  | 5 times | 7 times | 10 times |
| (A) (Conventional) | 225 | 115 | 37 |
| (B) (invention) | 3456 | 429 | 88 |

According to the results of the determination of viscosity for every mustard shown in Table 6, Section (B) is superior to section (A) on viscosity and water retention.

EXAMPLE 5

10, 15 and 20 g of conventional mustard flour A and mustard flour B of the present invention were individually added to a mixture of 50 g of lard and 50 ml of water. After fully stirring, each sample was placed into a color comparison tube of 50 ml capacity and left to settle. The separation of the components of each sample was observed after 24 hours. The results are shown in Table 7.

As indicated in Table 7, the mustard flour of section (B) of the invention and of high protein content was not separated and was superior to section (A) in emulsifying properties.

TABLE 7

| Test Section | Quantity of mustard | | |
| --- | --- | --- | --- |
|  | 10 g | 15 g | 20 g |
| (A) (conventional) | ± | + | — |
| (B) (invention) | + | — | — |

Note 1
Marks in table 7 indicate following meanings:
— ... Not separated, good
+ ... Separated a little
± ... Separated

What is claimed is:

1. A process for producing flour from mustard seed comprising the steps of:
   (a) compressing mustard seeds at a temperature below about 65° C. and at a pressure above about 1,000 Kg/cm², sufficient to remove oil therefrom;
   (b) heating the so-compressed seeds under conditions to decrease the activity of myrosinase enzyme in the seeds and thereby suppress pungency; and then
   (c) grinding the so-treated seeds to produce a mustard flour of reduced pungency and enhanced preservability.

2. A process according to claim 1, wherein the compressed mustard seed is heated at a temperature of from about 100° C. to 130° C. and under a pressure of from about 0.2 to 4.0 kg/cm² for a period of from about 3 to 10 minutes.

3. A process according to claim 2, wherein the compressed mustard seed is heated at a temperature of about 130° C. and under a pressure of about 4 kg/cm² for about 3 minutes.

4. A process according to claim 2, wherein the compressed mustard seed is heated at a temperature of about 100° C. and under a pressure of about 2 kg/cm² for about 10 minutes.

5. A process according to claim 1, wherein the mustard seed is compressed for a time sufficient to remove from about 15 to 20 weight percent of fatty substances therein contained.

6. A process according to claim 1, wherein the compressed mustard seed is heated to a temperature of from about 100° to 120° C.

7. A mustard seed flour of reduced pungency, good flavor, enhanced protein content and enhanced preservability, produced by the process of claim 1.

* * * * *